United States Patent
Callahan et al.

(10) Patent No.: US 8,715,871 B2
(45) Date of Patent: May 6, 2014

(54) ELECTROCHEMICAL CELL

(71) Applicant: Infinity Fuel Cell and Hydrogen, Inc., Windsor, MA (US)

(72) Inventors: Christopher Callahan, Cambridge, NY (US); James F. McElroy, Suffield, CT (US); Alfred Meyer, Simsbury, CT (US); William F. Smith, Suffield, CT (US)

(73) Assignee: Infinity Fuel Cell and Hydrogen, Inc., Windsor, CT (US)

( * ) Notice: Subject to any disclaimer, the term of this patent is extended or adjusted under 35 U.S.C. 154(b) by 0 days.

(21) Appl. No.: 13/938,826

(22) Filed: Jul. 10, 2013

(65) Prior Publication Data
US 2013/0302707 A1 Nov. 14, 2013

Related U.S. Application Data

(62) Division of application No. 12/533,258, filed on Jul. 31, 2009, now Pat. No. 8,506,787.

(51) Int. Cl.
*H01M 8/04* (2006.01)

(52) U.S. Cl.
USPC ........... 429/414; 429/450; 429/457; 429/533; 429/535

(58) Field of Classification Search
USPC .......................... 429/414, 450, 457, 533, 535
See application file for complete search history.

(56) References Cited

U.S. PATENT DOCUMENTS

| | | | |
|---|---|---|---|
| 4,729,932 A | 3/1988 | McElroy | |
| 5,316,644 A | 5/1994 | Titterington et al. | |
| 5,942,350 A | 8/1999 | Roy et al. | |
| 6,037,075 A | 3/2000 | Critz et al. | |
| 6,171,719 B1 | 1/2001 | Roy et al. | |
| 6,232,010 B1 * | 5/2001 | Cisar et al. | 429/465 |
| 6,783,885 B2 | 8/2004 | Shiepe et al. | |
| 6,838,202 B2 | 1/2005 | Brady et al. | |
| 7,147,677 B2 | 12/2006 | Edlund | |
| 2005/0017055 A1 | 1/2005 | Kurz et al. | |
| 2005/0181264 A1 | 8/2005 | Gu et al. | |
| 2007/0015035 A1 | 1/2007 | Izenson et al. | |
| 2007/0207368 A1 | 9/2007 | Anderson et al. | |
| 2010/0239949 A1 | 9/2010 | Maeda et al. | |

FOREIGN PATENT DOCUMENTS

| | | |
|---|---|---|
| WO | WO 98/23794 | 6/1998 |
| WO | WO 2008/096227 | 8/2008 |
| WO | WO 2009/060816 | 5/2009 |

* cited by examiner

*Primary Examiner* — Arun S Phasge
(74) *Attorney, Agent, or Firm* — Holland & Bonzagni, P.C.; Mary R. Bonzagni, Esq.

(57) ABSTRACT

An electrochemical cell having two or more diffusion bonded layers, which demonstrates a high degree of ruggedness, reliability, efficiency and attitude insensitiveness, is provided. The novel cell structure simplifies construction and operation of these cells. Also provided is a method for passive water removal from these cells. The inventive cell, as well as stacks made using these cells, is suitable for use in applications such as commercial space power systems, long endurance aircraft, undersea power systems, remote backup power systems, and regenerative fuel cells.

12 Claims, 4 Drawing Sheets

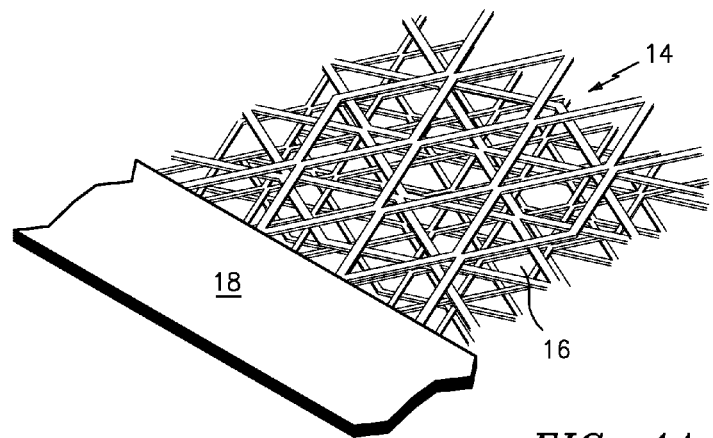
FIG. 1A
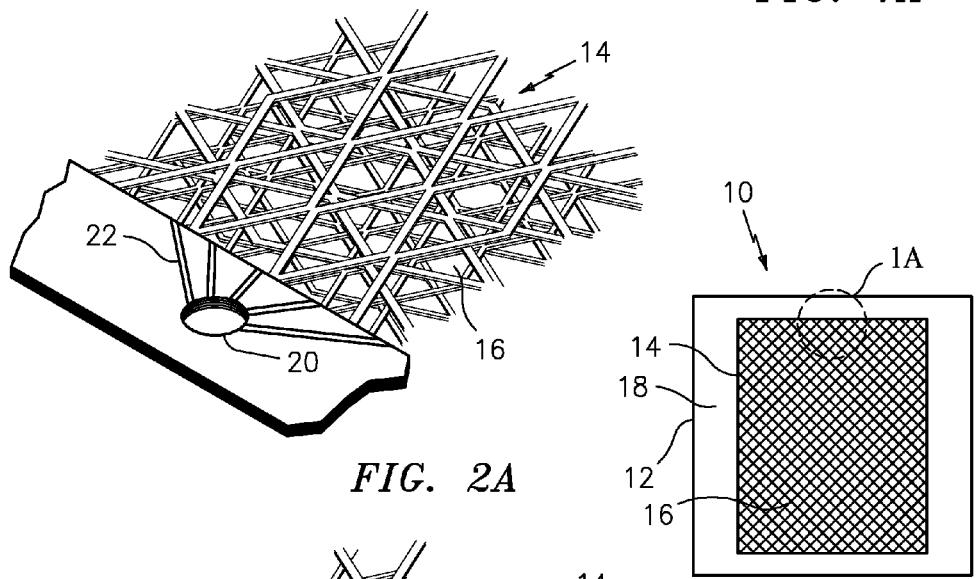
FIG. 2A
FIG. 1
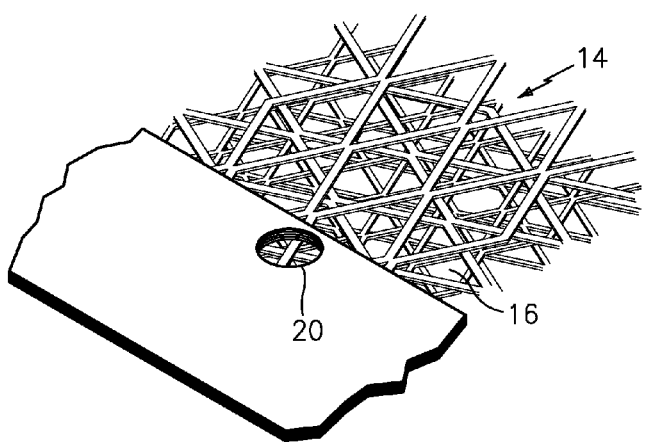
FIG. 2B

ELECTROCHEMICAL CELL

CROSS-REFERENCE TO RELATED APPLICATION

This application is a division of U.S. patent application Ser. No. 12/533,258, filed on Jul. 31, 2009, which is incorporated herein by reference in its entirety.

TECHNICAL FIELD

The present invention generally relates to an improved electrochemical cell, and more particularly relates to an electrochemical cell having two or more diffusion bonded layers.

BACKGROUND AND SUMMARY OF THE INVENTION

Electrochemical cell devices are typically made up of a plurality of electrochemical cells, arranged in groups or stacks, and commonly serve to: electrolytically disassociate water or another liquid (with or without dissolved constituents) into its components (i.e., electrolysis cells), or catalytically combine hydrogen or other fuel and an oxidizer (i.e., fuel cells), with electricity being either supplied or generated, respectively. Other related functions for electrochemical cell devices include their use as compressors, separation and/or purification means, sensors, and combinations of these functions.

Within arranged groups or stacks, each electrochemical cell includes a cathode, an electrolyte (e.g., a membrane), and an anode. In Proton Exchange Membrane or PEM cells, where the electrolyte is a cation exchange membrane, the cathode/membrane/anode assembly (i.e., "membrane electrode assembly" or "MEA") is typically supported on both sides by flow fields made up of screen packs or channeled plates. Flow fields, usually in the form of expanded metal or woven screens, or adhesive-bonded, laminated, or machined assemblies, facilitate fluid movement, removal of product water, and also serve to provide in, for example, PEM cells, mechanical support for the MEA.

By way of example, U.S. Pat. No. 5,316,644 to Titterington et al. teaches an electrochemical cell electrode plate structure that comprises a laminar assembly of at least two substantially identically configured and etched plate-shaped components. The plate-shaped components are adhered or bonded together using so-called laminating substances such as various epoxy resins, silicon and FLUOREL® elastomers and TEFLON® fluoroethylene propylene or FEP copolymers (see col. 9, lines 11 to 16, of U.S. Pat. No. 5,316,644). Cells made using these laminated electrode plate structures are known to have a high degree of flatness and strength. The process used to build these plate structures, however, is both time consuming and difficult to control. Moreover, plate structures that are built using this process are comprised of distinct layers that may degrade or exhibit high resistance at the interfaces.

A need exists for an electrochemical cell that overcomes the drawbacks associated with cells made using adhesive-bonded or laminated plate structures.

The present invention satisfies this need by providing an electrochemical cell that comprises two or more diffusion bonded layers, the diffusion bonded layers demonstrating excellent conductivity and improved resistance to delamination.

In a preferred embodiment, the inventive electrochemical cell comprises a diffusion bonded laminar or thin plate assembly in the form of, for example, a partially or fully diffusion bonded bipolar plate assembly.

The present invention further provides an arranged group or stack of the above-described electrochemical cells, with each such electrochemical cell preferably comprising either a partially or fully diffusion bonded bipolar plate assembly.

Each electrochemical cell in the stack will typically employ a porous plate/frame assembly for water/gas separation. Such an assembly may utilize a metallic or polymeric porous membrane. For metallic porous membranes (e.g., sintered metallic porous membranes), the membrane may be directly diffusion bonded into a bipolar plate assembly. For polymeric porous membranes, the membrane is preferably incorporated into the cell as a separate item. For example, the polymeric porous membrane would be supported by a first diffusion bonded plate assembly (e.g., oxygen screen/frame assembly) on one side, and a second diffusion bonded plate assembly (e.g., water chamber//divider sheet//coolant chamber//divider sheet//hydrogen chamber) on the other side.

In a first more preferred embodiment, the electrochemical cell stack of the present invention has internal manifolds positioned within the active area of each electrochemical cell, with each cell comprising an MEA and a partially or fully diffusion bonded bipolar plate assembly. The electrochemical cell stack in this embodiment is preferably a passive water removal cell stack employing hydrophilic porous plate/frame assemblies for water/gas separation, which is suitable for zero gravity operation.

In a second more preferred embodiment, the electrochemical cell stack has external manifolds (i.e., manifolds positioned outside the active area of each cell), which communicate with the active area of each electrochemical cell, with each cell comprising an MEA and a partially or fully diffusion bonded bipolar plate assembly.

Also provided by way of the present invention is a method for passive water removal from an electrochemical cell or cell stack, the method comprising:

providing one electrochemical cell or an arranged group or stack of cells, as described above, wherein each cell includes an MEA having an anode side and an opposing cathode side, open structures (e.g., screen/frame assemblies) located on opposing sides of the MEA, a hydrophilic porous plate or porous plate/frame assembly adjacent to and in intimate contact with the open structure located on the cathode side of the MEA, and a water collection chamber located on an opposing side of the hydrophilic porous plate or porous plate/frame assembly; and maintaining the open structure located on the cathode side of the MEA at a pressure greater than the pressure in the water collection chamber in the cell(s) during operation of the electrochemical cell or cell stack.

Other features and advantages of the invention will be apparent to one of ordinary skill from the following detailed description and accompanying drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings, in which:

FIG. 1 is a top or plan view of one embodiment of the diffusion bonded laminar assembly of the present invention in the form of an oxygen screen/frame assembly, while FIG. 1A is an enlarged view of one portion of this assembly showing overlying screen patterns in the assembly;

FIGS. 2A and 2B are both similar to FIG. 1A, and show two different manifold approaches, an external manifold approach (FIG. 2A) and an internal manifold approach (FIG. 2B);

BEST MODE FOR CARRYING OUT THE INVENTION

Figure 3:
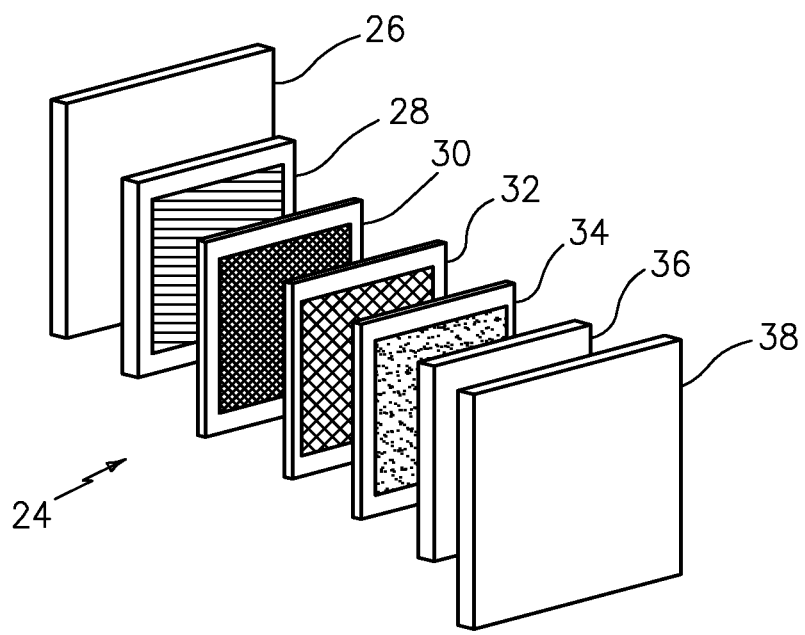
FIG. 3 is an exploded side view of one embodiment of the passive water removal (PWR) Proton Exchange Membrane (PEM) $H_2/O_2$ fuel cell of the present invention.

The diffusion bonded electrochemical cell of the present invention is a light weight cell that may be used as a fuel cell, regenerative fuel cell, electrolysis cell, and the like. This novel cell structure simplifies construction and operation of these cells. Moreover, the high degree of ruggedness, reliability, efficiency and attitude insensitiveness demonstrated by the inventive electrochemical cells render these cells suitable for use in applications such as undersea power systems for diving or subsea oil exploration, propulsion or data acquisition, commercial space power systems, remote backup power systems, long endurance aircraft, and regenerative fuel cells.

As noted above, the inventive electrochemical cell demonstrates excellent conductivity and improved resistance to delamination and comprises two or more diffusion bonded layers.

Referring now to FIG. 1 in detail, reference numeral 10 has been used to generally designate a diffusion bonded laminar assembly in the form of an oxygen screen/frame assembly or screen flowfield part used in one embodiment of the electrochemical cell of the present invention. The diffusion bonded oxygen screen/frame assembly or screen flowfield part 10 is a laminar assembly of four square-shaped layers or components 12, with each component 12 including a central portion 14 having a multitude of fluid-flow spaces 16 and a frame portion 18 integral with and circumferentially surrounding the central portion 14.

The oxygen screen/frame assembly or screen flowfield part shown in FIG. 1 was made by etching four layers of grade 316L stainless steel with screen and frame patterns. Each layer had a thickness of 0.004". Two layers measured: 0.125" long way dimension (LWD); 0.055"-0.062" short way dimension (SWD); and 0.012" strand width, while the other two layers measured: 0.077" LWD; 0.038"-0.043" SWD; and 0.007" strand width. The screen patterns in each set of two layers were orientated perpendicular to one another, and one set stacked on top of the other set such that each overlying layer in the resulting assembly alternated in screen orientation (see FIG. 1A). The stacked two-layer sets were then diffusion bonded into a final assembly. No frame-screen transition regularities were detected in the final assembly. Moreover, the assembly demonstrated a high degree of flatness and had excellent conductivity across the screen boundaries.

Two different manifold approaches, which are both suitable for use with the present invention, are shown in FIGS. 2A and 2B. In FIG. 2A, manifold 20 is positioned external to the active area (i.e., central portion 14) of the assembly or part, communicating with the active area via continuous flow channels 22. In FIG. 2B, manifold 20 is positioned over central portion 14, communicating directly with the active area of the assembly.

Diffusion bonding is basically a welding process by which a joint between similar or dissimilar metals, alloys, or non-metals is formed without the use of adhesives. The process involves pressing two materials together (typically in a vacuum) at a specific pressure and temperature for a particular holding time. Suitable pressures, temperatures, and holding times are well known to those skilled in the diffusion bonding art. Temperatures are typically set at 50-90% of the melting temperature of the most fusible material being bonded. Increasing the temperature aids in the interdiffusion of atoms across the face of the joint. During the diffusion bonding process, holding times are minimized.

Diffusion bonding simplifies cell and stack construction where this process naturally lends itself to automation and thus lower cost. Moreover, diffusion bonding does not produce harmful gases, ultraviolet radiation, metal spatter or fine dusts, nor does it require expensive solders, special grades of wires or electrodes, fluxes or shielding gases.

Where boundaries between layers disappear during the diffusion bonding process, excellent conductivity and resistance to delamination is ensured.

The electrochemical cell of the present invention may be manufactured using polymer, carbon, graphite, ceramic, composite, or metal based materials, with assembled stacks using either edge current collection or a bipolar current design.

As noted above, the cathode/electrolyte/anode assembly (i.e., membrane-electrode-assembly or MEA) in the electrochemical cell of the present invention has a first flow field in fluid communication with the cathode and a second flow field in fluid communication with the anode. These flow fields (i.e., open structures), which are made up of screen packs or channeled plates, facilitate fluid movement to and from the MEA and provide mechanical support for the MEA.

In one contemplated embodiment, bipolar plate assemblies are positioned on either side of the MEA and are each made up of an oxygen screen/frame assembly, a porous plate/frame assembly, a water chamber, a first separator or divider plate, a coolant chamber, a second separator or divider plate, and a hydrogen chamber. As will be readily appreciated by those skilled in the art, the water chamber may also be used as a coolant chamber in which case the bipolar plate assemblies could be streamlined to only include an oxygen screen/frame assembly, a porous plate/frame assembly, water/coolant chamber, a divider plate, and a hydrogen chamber.

For porous plate/frame assemblies made up of sintered metallic porous membranes, the bipolar plate assembly may be fully diffusion bonded, while for porous plate/frame assemblies made up of polymeric porous membranes, the bipolar plate assembly may be partially diffusion bonded. In particular, the polymeric porous membrane would be positioned between a first diffusion bonded plate assembly (e.g., oxygen screen/frame assembly) and a second diffusion bonded plate assembly (e.g., water chamber//first divider plate//coolant chamber//second divider plate//hydrogen chamber).

Referring now to FIG. 3, reference numeral 24 has been used to generally designate a preferred embodiment of the electrochemical cell of the present invention. In this first preferred embodiment, electrochemical cell 24 is a passive water removal (PWR) PEM $H_2/O_2$ fuel cell employing the diffusion bonded oxygen screen/frame assembly or screen flowfield part shown in FIG. 1. The PWR PEM $H_2/O_2$ fuel cell 24 has internal manifolds (not shown) positioned within the active area of the cell that are able to provide communication from cell to cell. Fuel cell 24 comprises: a first separator or divider plate 26; a water chamber or flowfield 28; a hydrophilic porous plate 30; a diffusion bonded oxygen screen/frame assembly 32; an MEA 34; a hydrogen flowfield 36; and a second separator or divider plate 38.

Upon testing, fuel cell 24 successfully performed the function of water management, gas admission, and gas distribution across the face of the cathode of the fuel cell.

By way of explanation, many PEM fuel cells remove product water by entraining this water in a flow of excess air or oxygen through the cathode side of the cell or by evaporation of water into a circulating gas stream. This excess flow delivers cell product water out of the cell where it is then separated or vented. While this is functional, it requires the introduction of additional system components that can add weight and complexity to a fuel cell system.

In the embodiment shown in FIG. 3, product water is removed directly from the cell with no flow circulation of reactants. The cell offers superior performance, lighter weight, and more durability.

Figure 4:
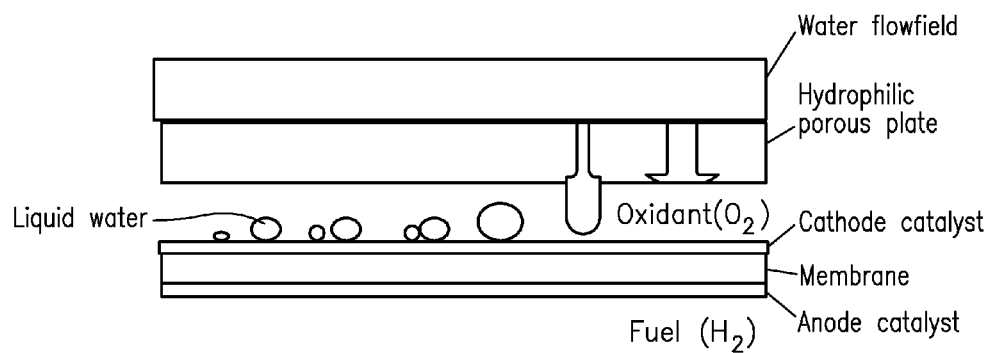
FIG. 4 is a diagrammatic depiction of water removal in a passive water removal cell (shown in cross-section) as the reaction proceeds within the cell.

The technique of passive water removal in a fuel cell, as well as the pore size and shape requirements for the hydrophilic porous plate, is taught in U.S. Pat. No. 4,729,932 to McElroy, which is incorporated herein by reference. By way of further explanation, and as best shown in FIG. 4, as the fuel cell reaction within a passive water removal cell proceeds, liquid water is formed at the cathode side of the MEA. More specifically, water molecules group together forming small droplets that grow to a radius approximately equal to the mesh size of the screen mesh (e.g., oxygen screen/frame assembly) located between the MEA and the porous plate. The water droplets fill one or more openings in the screen mesh, and then grow to span the distance between the MEA and the porous plate. Due to the properties of the porous plate, the water droplets are then quickly transported across the plate to the water chamber.

As is known to those skilled in fluid mechanics, the Bond number (Bo) represents the ratio of body forces (typically gravitational) to surface tension forces. If the Bo is much greater than 1, gravity dominates, and if the Bo is much less than 1, surface tension/energy dominates. The present inventors have determined that the Bo for the preferred PWR cell 24 is less than 0.05, which confirmed that surface tension effects predominated in cell 24, thereby confirming that the PWR process is suitable for zero gravity operation. The Bo was calculated in accordance with the following equation:

$$Bo = \frac{\rho a L^2}{\gamma}$$

where $\rho$ is water density, a is the acceleration associated with the body force, typically gravity, L is the characteristic length scale, and $\gamma$ is the surface tension of the interface.

The method for passive water removal from an electrochemical cell or stack of the present invention may be described as:

providing one electrochemical cell or an arranged group or stack of cells, as described above, wherein each cell includes an MEA having an anode side and an opposing cathode side, open structures (e.g., screen mesh or screen/frame assemblies) located on opposing sides of the MEA, a hydrophilic porous plate adjacent to and in intimate contact with the open structure located on the cathode side of the MEA, and a water collection chamber located on an opposing side of the hydrophilic porous plate; and maintaining the open structure located on the cathode side of the MEA at a pressure greater than the pressure in the water collection chamber in the cell(s) during operation of the electrochemical cell or cell stack.

Figure 5:
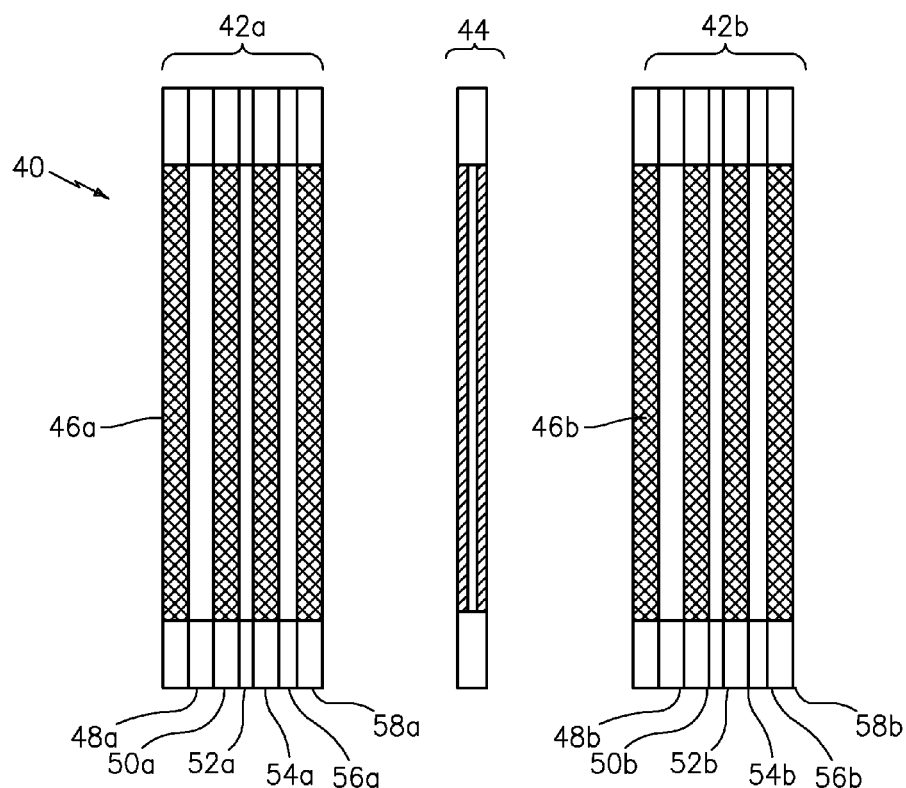
FIG. 5 is cross-sectional side view of another embodiment of the electrochemical cell of the present invention in the form of a PWR, PEM $H_2/O_2$ fuel cell that utilizes sintered metallic porous membranes for water/gas separation.

Referring now to FIG. 5, reference numeral 40 has been used to generally designate a section from a first preferred embodiment of the electrochemical cell stack of the present invention. In this first preferred embodiment, electrochemical cell stack 40 is a PWR PEM $H_2/O_2$ fuel cell stack that utilizes hydrophilic metallic porous membranes for water/gas separation. This cell stack, which has either internal or external manifolds (not shown), employs fully diffusion bonded repeating bipolar plates 42a, 42b positioned on either side of each MEA 44. The bipolar plate assemblies 42a, 42b are each made up of an oxygen screen/frame assembly 46a, 46b, a sintered metallic porous membrane or porous plate/frame assembly 48a, 48b, a water chamber 50a, 50b, a first separator or divider plate 52a, 52b, a coolant chamber 54a, 54b, a second separator or divider plate 56a, 56b, and a hydrogen chamber 58a, 58b.

Preferred power outputs of fuel cell stack 40, as shown in FIG. 5, range from about 1 to about 20 kW nominal @200 $ma/cm^2$.

During operation of PWR fuel cell stack 40, the water chamber side of the sintered metallic porous membrane or porous plate/frame assembly 48a, 48b in each cell is maintained at a pressure below that of the oxygen screen/frame assembly 46a, 46b side of the sintered metallic porous membrane or porous plate/frame assembly 48a, 48b.

Figure 6:
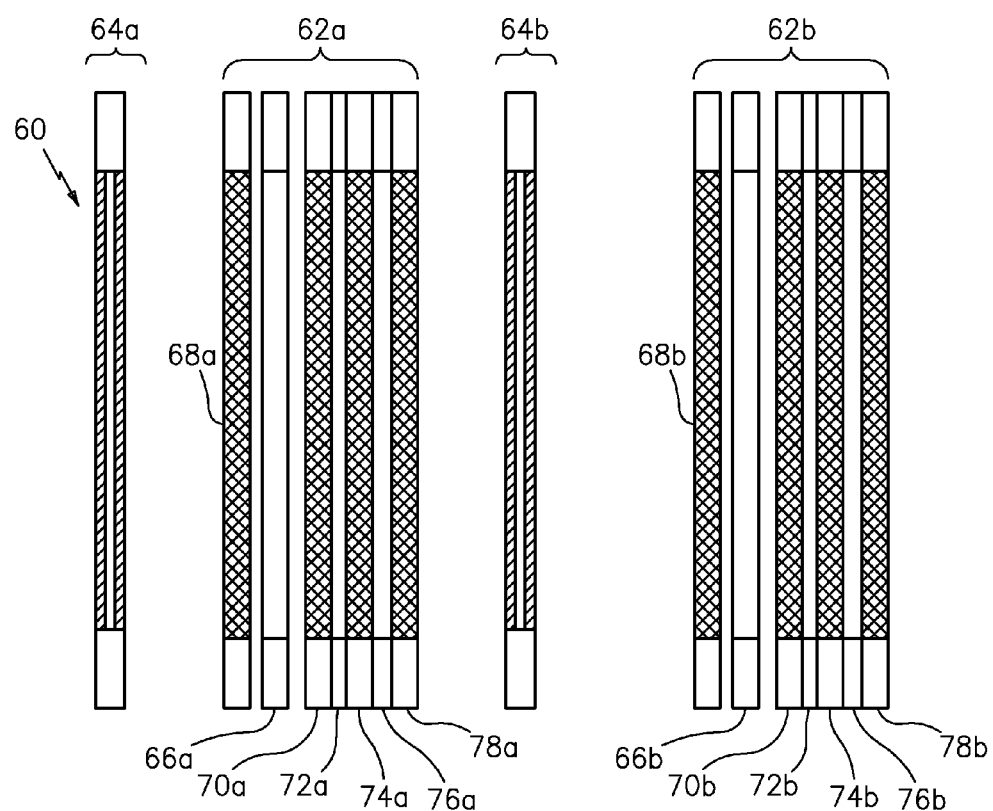
FIG. 6 is cross-sectional side view of yet another embodiment of the electrochemical cell of the present invention in the form of a PWR, PEM $H_2/O_2$ fuel cell that utilizes polymeric porous membranes for water/gas separation.

FIG. 6 depicts a second preferred embodiment of the electrochemical cell stack of the present invention. Reference numeral 60 has been used to generally designate this variation on design. In this second preferred embodiment, electrochemical cell stack 60 is a PWR PEM $H_2/O_2$ fuel cell stack that utilizes hydrophilic polymeric porous membranes for water/gas separation. This cell stack also has either internal or external manifolds (not shown) and has partially diffusion bonded repeating bipolar plates 62a, 62b positioned on either side of each MEA 64a, 64b. The bipolar plate assemblies 62a, 62b are each made up of a polymeric water-gas porous membrane 66a, 66b that is supported on either side by the following assemblies: a diffusion bonded oxygen screen/frame assembly 68a, 68b, and a diffusion bonded assembly made up of a water chamber 70a, 70b, a first separator or divider plate 72a, 72b, a coolant chamber 74a, 74b, a second separator or divider plate 76a, 76b, and a hydrogen chamber 78a, 78b.

The polymeric water-gas porous membrane 66a, 66b, of electrochemical cell stack 60 may or may not be electrically conductive. If electrically conductive, cell stack 60 may utilize current flow through the center of the cell. If not electrically conductive, current may flow external to each cell using an edge conduction approach, or active area conduction pathways.

One noteworthy advantage of fuel cell stack 60 is its light weight design, made possible by the very thin cells prepared using this diffusion bonding process.

During operation of PWR fuel cell stack 60, the differential pressure across the polymeric water-gas porous membrane 66a, 66b in each cell is maintained such that the pressure of the water chamber 70a, 70b side of the polymeric water-gas porous membrane 66a, 66b is below that of the oxygen screen/frame assembly 68a, 68b side of the polymeric water-gas porous membrane 66a, 66b.

While various embodiments of the inventive electrochemical cell and arranged groups or stacks of such electrochemical cells have been described herein, it should be understood that they have been presented by way of example only, and not limitation. Thus, the breadth and scope of the present invention should not be limited by any of the exemplary embodiments.

Having thus described the invention, what is claimed is:

1. A method for passive water removal from an electrochemical cell or cell stack, the method comprising:
    providing one electrochemical cell or an arranged group or stack of cells, wherein each cell includes a membrane electrode assembly having an anode side and an opposing cathode side, and a diffusion bonded bipolar plate assembly, the bipolar plate assembly comprising:
        a water flowfield;
        an oxygen screen/frame assembly having a screen mesh including a plurality of openings forming fluid-flow spaces; and
        a hydrophilic porous plate comprising a sintered metallic porous membrane for water-gas separation, which allows water to pass and resists gas intrusion, wherein the hydrophilic porous plate is located between and diffusion bonded to the water flowfield and the oxygen screen/frame assembly,
    wherein the oxygen screen/frame assembly is located on the cathode side of the membrane electrode assembly; and
    maintaining the oxygen screen/frame assembly at a pressure greater than the pressure in the water flowfield during operation of the electrochemical cell or cell stack.

2. The method of claim 1, wherein the bipolar plate assembly of the electrochemical cell or of each cell in the cell stack further comprises the following layers: a divider plate, and a hydrogen flowfield, wherein the hydrogen flowfield is located on the anode side of the membrane electrode assembly.

3. The method of claim 2, wherein the bipolar plate assembly further comprises: first and second divider plates and a coolant chamber between the divider plates.

4. The method of claim 2, wherein the diffusion bonded bipolar plate assembly of the electrochemical cell or of each cell in the cell stack is a fully diffusion bonded assembly.

5. The method of claim 1, wherein the sintered metallic porous membrane of the bipolar plate assembly of the electrochemical cell or of each cell in the cell stack is a hydrophilic sintered metallic porous membrane.

6. The method of claim 5, wherein the electrochemical cell or cell stack is a passive water removal PEM $H_2/O_2$ fuel cell.

7. The method of claim 1, wherein each cell of the cell stack has an active area, the active areas of the cells being in overlying arrangement, wherein the cell stack has internal manifolds positioned within the active areas of the cells, the internal manifolds communicating directly with these active areas.

8. The method of claim 7, wherein the sintered metallic porous membrane of each bipolar plate assembly of each cell in the cell stack is a hydrophilic sintered metallic porous membrane.

9. The method of claim 1, wherein each cell in the cell stack has an active area, the active areas of the cells being in overlying arrangement, wherein the cell stack has external manifolds which communicate with these active areas by way of continuous flow channels located between the external manifolds and the active areas.

10. The method of claim 1, wherein the diffusion bonded bipolar plate assembly of the electrochemical cell or of each cell in the cell stack is a fully diffusion bonded assembly.

11. The method of claim 1, wherein diffusion bonding of the sintered metallic porous membrane to the water flowfield and the oxygen screen/frame assembly of the electrochemical cell or of each cell in the cell stack takes place under pressure at temperatures equal to 50-90% of the sintered metallic porous membrane's melting temperature.

12. A method of making an electrochemical cell that is made up of a membrane electrode assembly, and a bipolar plate assembly, wherein the bipolar plate assembly is made up of a water flowfield, an oxygen screen/frame assembly having a screen mesh including a plurality of openings forming fluid-flow spaces, and a sintered metallic porous membrane for water-gas separation, which allows water to pass and resists gas intrusion, wherein the method comprises: positioning the sintered metallic porous membrane between the water flowfield and the oxygen screen/frame assembly; and diffusion bonding the sintered metallic porous membrane to the water flowfield and to the oxygen screen/frame assembly under pressure and at temperatures equal to 50-90% of the sintered metallic porous membrane's melting temperature.

* * * * *

UNITED STATES PATENT AND TRADEMARK OFFICE
CERTIFICATE OF CORRECTION

PATENT NO. : 8,715,871 B2
APPLICATION NO. : 13/938826
DATED : May 6, 2014
INVENTOR(S) : Christopher Callahan et al.

It is certified that error appears in the above-identified patent and that said Letters Patent is hereby corrected as shown below:

In the Specification

Col. 1, between lines 8 and 9, insert the following statement:

-- STATEMENT OF GOVERNMENTAL INTEREST:

This invention was made with Government support under contract NNC06CA18C awarded by NASA. The Government has certain rights in this invention. --

Signed and Sealed this
Fifth Day of August, 2014

Michelle K. Lee
*Deputy Director of the United States Patent and Trademark Office*